Feb. 15, 1938.    E. H. TAYLOR    2,108,301
FILLING MECHANISM FOR ELECTRIC FUSES
Filed Feb. 14, 1936    3 Sheets-Sheet 1

Inventor.
Elmer H. Taylor
by T. T. Greenwood atty

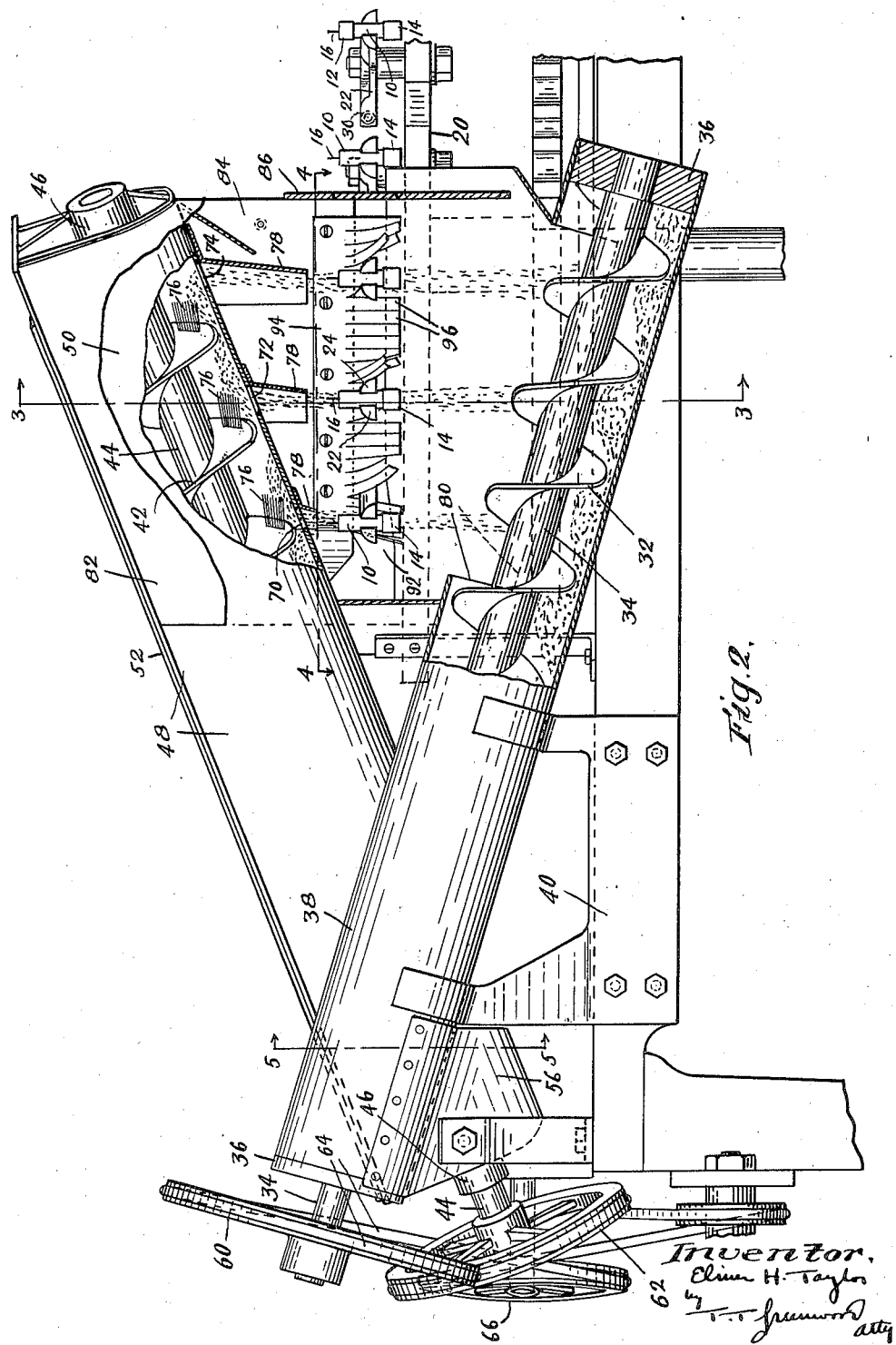

Feb. 15, 1938.　　　E. H. TAYLOR　　　2,108,301
FILLING MECHANISM FOR ELECTRIC FUSES
Filed Feb. 14, 1936　　　3 Sheets-Sheet 3
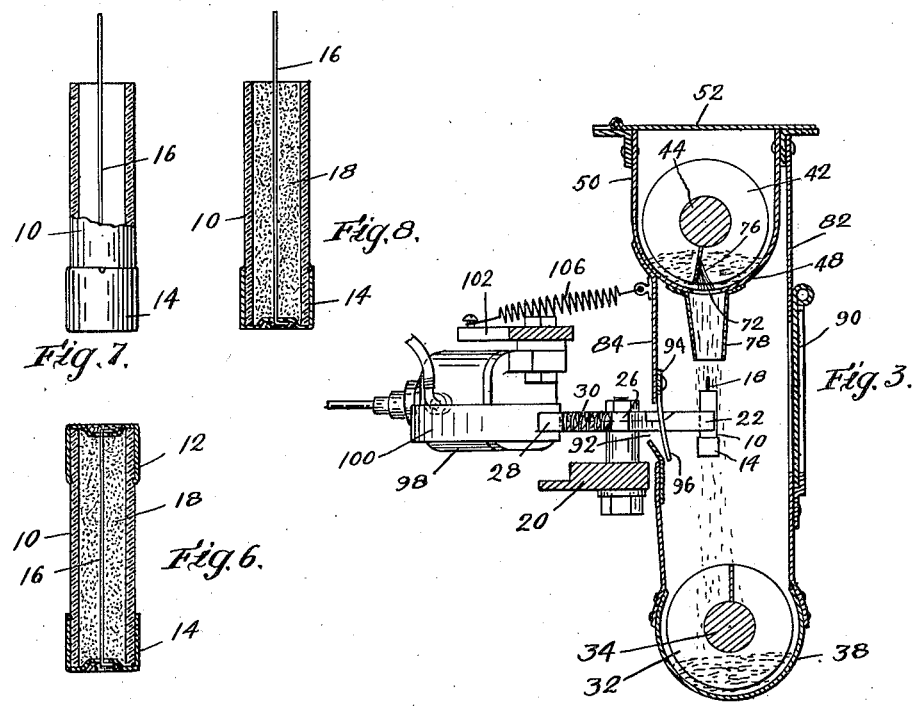
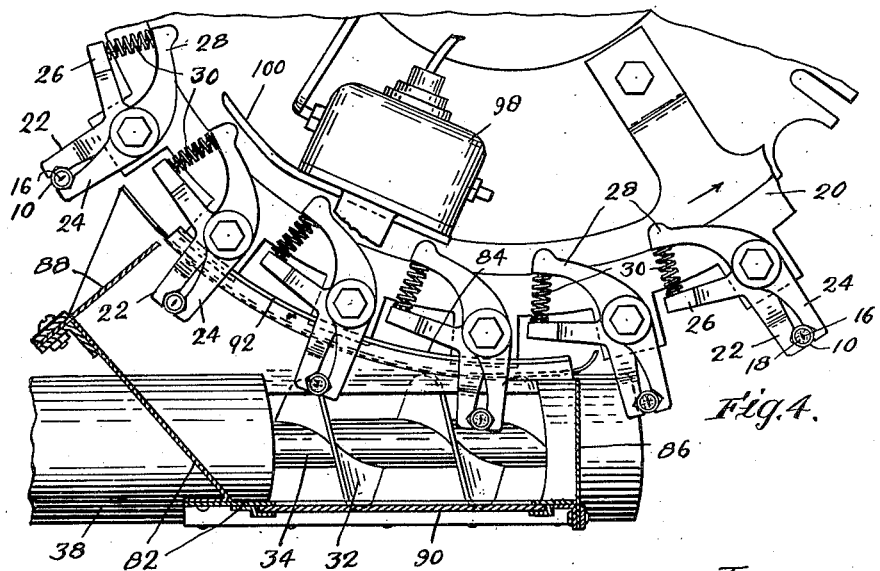

Patented Feb. 15, 1938

2,108,301

UNITED STATES PATENT OFFICE 2,108,301

FILLING MECHANISM FOR ELECTRIC FUSES

Elmer H. Taylor, Newburyport, Mass., assignor to The Chase-Shawmut Company, Newburyport, Mass., a corporation of Massachusetts Application February 14, 1936, Serial No. 63,907

12 Claims. (Cl. 226—96)

This invention relates to the manufacture of electric fuses.

The particular fuse to the manufacture of which this invention relates, is a cartridge fuse of the type comprising a tubular enclosing casing of insulating material having metal terminal caps on the ends thereof, a fusible element or link extended through the casing and connected electrically with the end caps and a loose filler of insulating arc-quenching material in the casing around the fusible link.

An object of the present invention is the provision of an improved mechanism for automatically filling a succession of the fuse casings with the insulating arc-quenching material.

Another object of the invention is a casing filling mechanism which includes a movable carrier adapted to contain a succession of fuse casings that are open at one end and means to provide a stream or shower of the insulating arc-quenching material into which the successive casings are advanced, thereby to become filled with the material.

Another object of the invention is in the provision of filling mechanism for fuse casings wherein means is provided to obtain a constant stream or shower of the casing filling material through which the casings pass, the excess material being caught and returned to the shower.

An additional object is the provision of a filling mechanism wherein the filling material is circulated in a closed cycle and wherein the fuse casings to be filled are moved into and out of a position of the circulating path to receive a portion of the circulating material.

A further object is the provision of means for subjecting the fuse casing repeatedly to a filling operation to ensure the complete filling of the casing, the casing being vibrated during and also between the filling operations.

A yet further object of the invention is the provision of casing filling mechanism for electric fuses wherein a constant shower or stream of the filling material is provided through which the casings pass, the mechanism including a pair of conveyor worms or screws one of which receives surplus material from the shower and conveys the material to the second worm which advances it to the showering orifice, the worms and their casings also constituting the reservoir for a supply of the filling material.

Another object is the provision of casing filling mechanism wherein means is provided to prevent the escape of filling material from the mechanism while permitting the entrance and departure of the casings into and out of the mechanism.

Another object is generally to improve the construction and operation of casing filling mechanisms for electric fuses.

In the drawings:—

Fig. 2 is an enlarged side elevation partly in section of the filling mechanism of Fig. 1.

Fig. 3 is a sectional view taken along line 3—3 of Fig. 2.

Fig. 4 is a sectional detail taken along line 4—4 of Fig. 2.

Fig. 6 is a longitudinal section through an electric fuse the manufacture of which is in part the product of the present invention.

Fig. 7 is an elevation partly in section of a fuse casing adapted to be filled by the mechanism of the present invention; and Fig. 8 is a view similar to Fig. 7 but illustrating the filled fuse casing.

The completed fuse that is a partial product of the present invention, see especially Fig. 6, comprises a tubular enclosing casing 10 of suitable insulating material, as fibre, having metal end caps 12 and 14 on the ends thereof. A fusible element or link 16 extends longitudinally through the casing and is soldered to the end caps. The casing contains a body of a loose electrically insulating arc-quenching filler 18 which is introduced into the casing by the mechanism of the present invention. The filler 18 can be any powdered, granular, or loose flowable material that is effective in suppressing the circuit interrupting arc formed upon the fusing of the fusible element when it is traversed by an excessive current. A filling material consisting partly or wholly of plaster of Paris or the like in small particles of different sizes is suitable.

Figure 1:
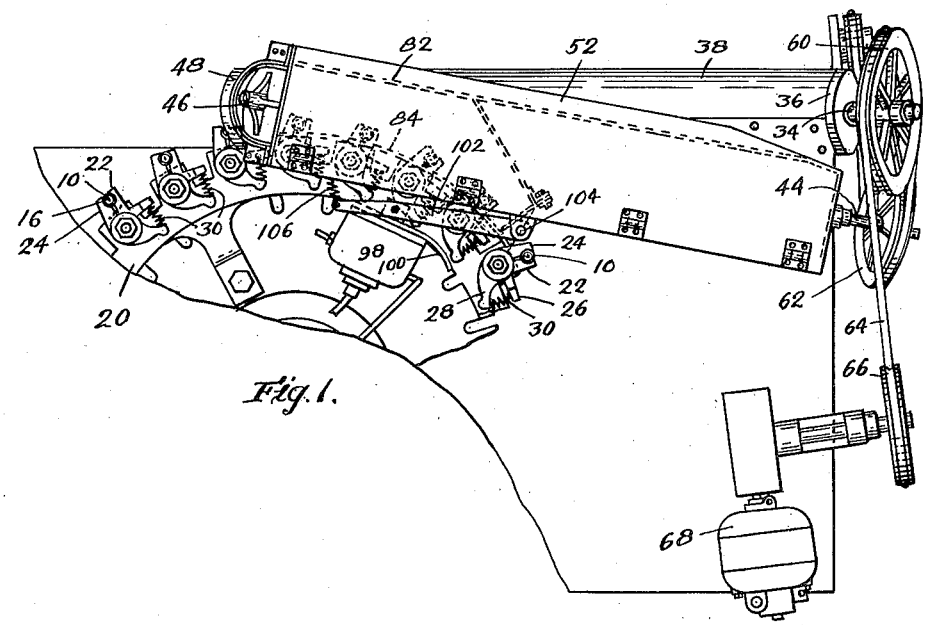
Fig. 1 is a plan view of the casing filling mechanism embodying the present invention.

The filling mechanism includes an intermittently advanceable carrier 20 for a succession of fuse casings. The carrier has a plurality of equally spaced fuse holders thereon, each fuse holder comprising a stationary jaw 22, see especially Figs. 1 and 2, and a cooperating pivoted jaw 24 between which a fuse casing 10 is adapted to be gripped. Both jaws are provided with rearwardly extended tails 26 and 28 respectively between which a compression spring 30 is located and against which tails the spring bears to constantly urge the pivoted jaw toward the stationary jaw and thus to cause the fuse casing to be gripped yieldingly between the jaws. The casing can be removed from between the jaws by pressing the tail 28 outwardly against the pressure of the spring 30 thereby to release the jaws from their grip on the casing. So far as the present invention is concerned, however, the casings are not removed from the engagement of the jaws.

Each of the sets of jaws is adapted to grip an open ended fuse casing illustrated in Fig. 7 as comprising the casing 10, the lower end cap 14, and the fusible element 16 which projects outwardly beyond the open upper end of the casing. The casing is arranged vertically in the jaws with the open end uppermost. The open ends of all the casings of the sets of jaws stand substantially to the same height above the jaws.

The carrier with the open ended casings is advanced in an intermittent or step by step manner into and out of a filling position where the casings are subjected to one or more streams or showers of the filling material which pours down upon the open ends of the casings and thereby in part enters and fills the casings, the excess passing to one side of the casings.

The filling mechanism includes a lower conveyor worm or screw 32, see especially Figs. 2 and 3, which is fixed to a shaft 34 that is rotatable in end bearings 36 of a generally tubular housing 38. The lower end of the housing is disposed beneath the fuse casings when they are in filling position, three filling positions being herein shown, and the casing and the worm being inclined upwardly and toward the left. The casing is supported stationarily in position by means including a suitable bracket 40.

The worm 32 feeds into a second worm 42 carried by a shaft 44 journalled in end bearings 46 of a casing 48. Said casing is semi-cylindrical in the lower part to conform with the cylindrical outline of the worm and has generally parallel side walls 50 above the axis of the worm. The casing has an opening at the top and is provided with a hinged or other cover 52 that is removable from said opening and through which access to the interior of the casing may be gained for introducing thereinto additional quantities of filling material from time to time to make up for the filling material deposited in the fuse casings. The second worm and its casing 48 is located at the side of the first worm and is inclined upwardly from the upper end of the first worm to a point above the carrier and the fuses therein.

Figure 5:
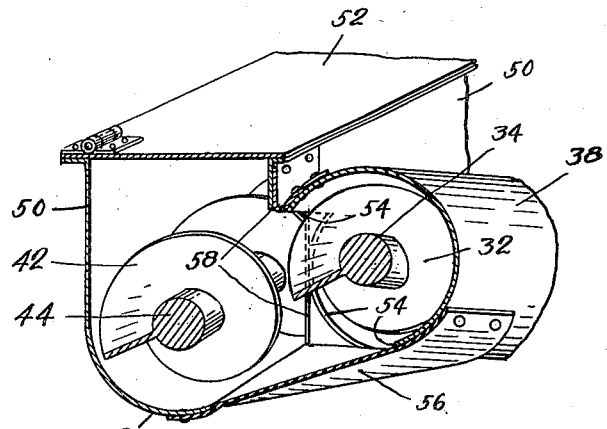
Fig. 5 is a sectional detail taken along line 5—5 of Fig. 2.

The first worm 32 is adapted to feed into the second worm, as illustrated in Fig. 5. The casing 38 for the first worm at the point of crossing of the worms has an opening 54 in the lower portion of its side wall which communicates with a chute 56 which conducts the filling material downwardly and through an opening 58 in the casing 48 for the second worm and into the interior of the casing.

The shafts 34 and 44 of the worms are provided respectively with pulleys 60 and 62 about which a driving belt 64 is passed. Said belt is also passed over a driving pulley 66 rotated at reduced speed through a motor 68 that operates continuously when the filling mechanism is in operation. The direction of rotation of the worms is such as to advance the material from the lower portion of the first worm to the upper portion of the second worm.

The upper portion of the casing of the second worm is herein shown as provided with three discharge orifices or openings 70, 72 and 74, respectively, which are positioned above three successive fuse casings when they are stationary in filling position. Said openings are larger than the cross-section of the open end of the fuse casing. The worm 42 as it rotates advances the filling material in its casing upwardly toward and some of the material into the apertures where the material falls in a continuous stream or shower through the apertures and upon the open ends of the casings. Some of the material falls into the casings and some falls by the casings. The provision of three filling openings provides positive assurance that the casing will be completely filled with the filling material when it passes from the action of the filling mechanism. The worm 42 at one or more of its convolutions has brushes 76 secured thereto at the vicinity of the openings which agitate the filling material and prevent it from compacting and thereby assure the free flowing of the filling material through the openings.

Guide chutes or nozzles 78 are secured to the casing 48 about the discharge openings to guide the showers of filling material downwardly upon the casings positioned thereunder. The filling material that does not fall into the fuse casings enters an opening 80 in the top portion of the casing 38 of the lower worm, and thus is caused to be readvanced again by the action of the lower worm. The lower casing thus constitutes a hopper for the unused filling material. The filling material is thus circulated in a closed cycle system wherein the fuse casings are moved into and out of a part of the circulating system to receive a portion of the circulating filling material.

The filling space between the two worm casings is enclosed by means including a front cover plate 82, see Fig. 3, and a rear cover plate 84, together with side plates 86 and 88. The enclosing plates are so shaped as to guide the showers of material from the fuse casings into the lower worm casing 38. The front cover plate 82 is provided with a slide plate 90 which can be raised to observe the action of the showers. The side plates 86 and 88 are flexible as by being made of leather or the like and are adapted to be pushed to one side to permit the entrance and the exit of the jaws of the carrier and the fuses therein to and from the filling space. The rear wall 84 is provided with a horizontal slot 92 therein along which the jaws of the carrier are intermittently advanced. The slot is closed by a curtain 94 having flexible depending strips 96 which are progressively brushed aside by the jaws when they are advancing and hang downwardly over and in closing relation with the slot 92 between the jaws, thereby to keep the slot closed as completely as is practicable.

The casings are vibrated during the filling thereof to insure the shaking down of the filler material in the casings and thereby to provide for a completely filled casing. The vibrating mechanism includes an electromagnetically operated vibrator 98 having a vibratile shoe 100 which is disposed in position to engage the tails 28 of two successive jaws when they are in filling position, thereby to vibrate the jaws and the casing therebetween and also the filling material in the casings. The vibratory movement is not sufficient, however, to cause the opening of the jaws. Said vibrator is secured to a lever 102, see Figs. 1 and 3, pivoted at 104 to the shower casing and having its free end connected to a retractile spring 106 which serves to hold the vibrator in engagement with the tails of the successive gripping jaws as they arrive in filling position. The vibrator is continuous in its operation and also engages the tails of the jaws of casings containing filling material as the carrier is advanced from one opening to another and hence vibrates the casings between successive filling operations.

I claim:

1. Filling mechanism for electric fuses comprising means providing a discharge opening for filling material, means including a continuously rotating conveyor worm that sweeps across said opening for conveying filling material to and for causing filling material to pass through said opening in a continuous stream, means for advancing a succession of open fuse casings into and out of the path of material falling from said opening, and a conveyor worm operative to collect and discharge directly into said first named conveyor worm material which does not enter the fuse casings.

2. Filling mechanism for electric fuses comprising means providing a plurality of discharge openings for filling material, means including a conveyor worm sweeping over said openings for sweeping filling material through said openings to fall therefrom in free unobstructed streams, means for intermittently advancing each of a spaced succession of open fuse casings in succession into and out of position beneath said plurality of openings, and means including a second conveyor worm for catching excess filling material under the casings and discharging the material directly to said first worms.

3. Filling mechanism for electric fuses comprising a worm conveyor for filling material including a casing having a discharge opening from which the filling material falls, a worm in said casing for advancing material toward said opening, means for advancing a succession of open fuse casings into and out of filling position under said opening to receive filling material therefrom, a second worm conveyor having an entrance for filling material disposed under said opening and discharging into said first conveyor, and means for advancing a succession of open fuse casings into filling position under said opening and above said entrance.

4. Filling mechanism for electric fuses comprising a pair of divergent upper and lower worm conveyors for filling material having casings opening one into the other at their adjacent ends and the separated ends being one vertically over the other, worms in said casings, the worm in said lower casing feeding into the worm of the upper casing, said upper casing having a discharge opening in its upper end and said lower casing having an entrance in its lower end, which entrance is disposed below said opening and in position to receive filling material discharged from said opening, and means to advance a succession of open fuse casings into filling position under said discharge opening.

5. Filling mechanism as defined in claim 4, said upper conveyor casing having a plurality of discharge openings through which the filling material passes, and said casing advancing means being operable to advance the same casing successively into position under said openings.

6. Filling mechanism for electric fuses comprising a fuse casing carrier having sets of casing gripping jaws successively advanceable into and out of a casing filling position, means for causing a stream of filling material to fall upon casings in said jaws when they are in filling position, and vibrator means disposed in position to engage and vibrate said jaws when they are in filling position.

7. Filling mechanism for electric fuses comprising a fuse casing carrier having sets of casing gripping jaws successively advanceable into and out of a casing filling position, means for causing a stream of filling material to fall upon casings in said jaws when they are in filling position, said jaws having tails, and vibrator means disposed in position to engage said tails when said jaws are in filling position to vibrate the casings therebetween.

8. Filling mechanism for electric fuses comprising means providing a plurality of discharge openings for filling material, means for advancing a succession of open fuse casings successively in filling position under said openings and different casings simultaneously under different openings, including a carrier having a plurality of sets of casing gripping jaws, and a vibrator device disposed in position to operate simultaneously upon a plurality of said jaws and successively upon the successive jaws.

9. Filling mechanism for electric fuse casings comprising superimposed upper and lower receptacles for filling material, means providing an enclosure for the space between said receptacles, said upper receptacle having an outlet through which a stream of filling material is adapted to flow in said enclosure into said lower receptacle, means for transferring filling material from said lower into said upper receptacle, and a fuse casing carrier having sets of fuse gripping jaws, said carrier being advanceable to advance said sets of jaws successively into and out of said enclosure and through the stream of filling material, said enclosure having an inlet and an outlet for said jaws, and flexible closures for said inlet and outlet.

10. Filling mechanism for electric fuse casings comprising two divergent worm casings having their one ends adjacent and in intercommunication with each other and their other ends vertically spaced, the upper casing at the said other end thereof having an outlet through which a stream of filling material is adapted to flow into the said other end of the lower casing, worms in said casing operable to move the filling material from one worm casing into the other worm casing and out of said outlet, and a fuse casing carrier having fuse casing holding means advanceable into and out of the space between the separated ends of said worm casings and through the stream of filling material.

11. Filling mechanism for electric fuse casings comprising a downwardly inclined upper worm casing and an upwardly inclined lower worm casing, said two casings being in communication at one end and being vertically separated at the other end, worms in said casings for moving filling material from the lower end of the lower casing toward the upper end of the upper casing, said upper casing having an outlet through which a stream of filling material is adapted to fall into said lower casing, and a fuse casing carrier having sets of fuse gripping jaws advanceable into the space between the separated ends of said worm casings and under said outlet.

12. Filling mechanism comprising a pair of interconnected worm casings having divergent vertically separated ends provided with confronting openings therein through the upper one of which openings filling material is adapted to flow into the lower opening, conveyor worms in said casing, one worm feeding into the other and both operative to transfer filling material from the lower to the upper opening, and means to position successive containers in position under the upper opening.

ELMER H. TAYLOR.